United States Patent
Klanow

(10) Patent No.: US 11,208,972 B2
(45) Date of Patent: Dec. 28, 2021

(54) DETECTION AND CONTROL OF INTAKE SYSTEM NOISE DURING LOW PRESSURE EXHAUST GAS RECIRCULATION OPERATION

(71) Applicant: Kyle O Klanow, Troy, MI (US)

(72) Inventor: Kyle O Klanow, Troy, MI (US)

(*) Notice: Subject to any disclaimer, the term of this patent is extended or adjusted under 35 U.S.C. 154(b) by 145 days.

(21) Appl. No.: 16/703,171

(22) Filed: Dec. 4, 2019

(65) Prior Publication Data
US 2021/0172403 A1    Jun. 10, 2021

(51) Int. Cl.
| | |
|---|---|
| F02M 26/06 | (2016.01) |
| F02M 26/60 | (2016.01) |
| F02M 26/22 | (2016.01) |
| F02D 41/00 | (2006.01) |
| F02B 37/007 | (2006.01) |
| F02M 35/12 | (2006.01) |
| F02B 75/18 | (2006.01) |

(52) U.S. Cl.
CPC ......... F02M 26/06 (2016.02); F02B 37/007 (2013.01); F02B 75/18 (2013.01); F02D 41/0007 (2013.01); F02D 41/0077 (2013.01); F02M 26/22 (2016.02); F02M 26/60 (2016.02); F02M 35/1222 (2013.01); F02B 2075/1824 (2013.01); F02D 2200/0406 (2013.01); F02M 2700/31 (2013.01)

(58) Field of Classification Search
CPC .... F02M 26/06; F02M 35/1222; F02M 26/60; F02M 26/22; F02M 2700/31; F02D 41/0077; F02D 41/0007; F02D 2200/0406; F02B 75/18; F02B 37/007; F02B 2075/1824

USPC ...................................................... 60/605.2
See application file for complete search history.

(56) References Cited

U.S. PATENT DOCUMENTS

| | | | |
|---|---|---|---|
| 5,613,479 A | * | 3/1997 | Gates ............... F02M 26/47 123/568.27 |
| 9,726,090 B2 | | 8/2017 | Kim et al. |
| 9,966,057 B1 | | 5/2018 | Wang |

FOREIGN PATENT DOCUMENTS

| | | | | |
|---|---|---|---|---|
| CA | 3036335 A1 | * | 3/2018 | ......... F02D 41/0052 |
| CN | 106677911 A | * | 5/2017 | ............ F02M 26/08 |
| JP | 08240158 A | * | 9/1996 | |
| JP | 2003269264 A | * | 9/2003 | |
| JP | 2009150331 A | | 7/2009 | |
| JP | 2010179856 A | * | 8/2010 | |
| JP | 2011220127 A | * | 11/2011 | ............ F02M 26/19 |

* cited by examiner

*Primary Examiner* — J. Todd Newton
(74) *Attorney, Agent, or Firm* — Ralph E. Smith

(57) ABSTRACT

Intake noise suppression techniques for a forced-induction engine having a low pressure exhaust gas recirculation (LPEGR) system configured to recirculate exhaust gas produced by the engine to an intake system of the engine via an EGR port comprise receiving, from a mass air flow (MAF) sensor of the engine, a MAF signal indicative of measured airflow through the intake system, detecting, based on the MAF signal, intake system conditions that are indicative of audible noise, and in response to detecting the detected intake system conditions that are indicative of audible noise, at least partially closing a differential pressure (dP) valve to mitigate or eliminate the intake system conditions and the corresponding audible noise, wherein the MAF sensor is disposed in the intake system upstream from the dP valve.

16 Claims, 3 Drawing Sheets

DETECTION AND CONTROL OF INTAKE SYSTEM NOISE DURING LOW PRESSURE EXHAUST GAS RECIRCULATION OPERATION

FIELD

The present application generally relates to exhaust gas recirculation (EGR) and, more particularly, to techniques for detecting and controlling intake system noise during low pressure EGR (LPEGR) operation.

BACKGROUND

A forced-induction engine is capable of combusting larger air/fuel charges compared to naturally-aspirated engines. This is achieved using a boost device (a turbocharger, a supercharger, etc.) that forces air into cylinders of the engine, which is the combined with fuel and combusted to drive pistons and generate drive torque. Exhaust gas resulting from combustion is expelled from the cylinders and, in some cases, its kinetic energy is utilized to power the boost device (e.g., a turbine of a turbocharger). Before being treated and released into the atmosphere, at least some of the exhaust gas could be recirculated back into an intake system of the engine, which is also known as exhaust gas recirculation (EGR) or for a forced-induction engine as described, low pressure EGR (LPEGR). EGR provides for improved combustion stability at certain engine operating conditions. In some cases, however, the propagation of EGR back into the intake system results in audible noise, which could be undesirable to a driver of the vehicle or other nearby persons. Accordingly, while such LPEGR systems do work well for their intended purpose, there remains a need for improvement in the relevant art.

SUMMARY

According to one example aspect of the invention, an intake noise suppression system for a forced-induction engine having a low pressure exhaust gas recirculation (LPEGR) system configured to recirculate exhaust gas produced by the engine to an intake system of the engine via an EGR port is presented. In one exemplary implementation, the intake noise suppression system comprises: a differential pressure (dP) valve disposed in the intake system upstream from the EGR port and configured to control a dP across an EGR valve of the LPEGR system, a mass air flow (MAF) sensor disposed in the intake system upstream from the dP valve and configured to generate a MAF signal indicative of measured airflow through the intake system, and a controller configured to: based on the MAF signal, detect intake system conditions that are indicative of audible noise, and in response to detecting the detected intake system conditions that are indicative of audible noise, at least partially close the dP valve to mitigate or eliminate the intake system conditions and the corresponding audible noise.

In some implementations, the controller is further configured to: determine a desired MAF signal amplitude based on a set of engine operating parameters, determine an average amplitude of the MAF signal over a period of time, and detect the intake system conditions that are indicative of audible noise when the average MAF signal amplitude exceeds the desired MAF signal amplitude. In some implementations, the controller is further configured to: determine a first error indicative of a difference between the average and desired MAF signal amplitudes, determine a dP valve angle adjustment value based on the first error and using a first proportional-integral-derivative (PID) control scheme, determine a target dP valve angle based on a base dP valve angle, an EGR status, and a dP valve angle limit, and control an angle of the dP valve based on the target dP valve angle.

In some implementations, the controller is configured to close the dP valve up until the dP valve angle limit is reached, and the dP valve angle limit corresponds to a minimum EGR valve dP for a target engine operating efficiency. In some implementations, the dP valve comprises a dP valve motor and a dP valve angle sensor and the controller is further configured to: determine a second error indicative of a difference between an actual dP valve angle as measured by the dP valve angle sensor and the target dP valve angle, and control a duty cycle of the dP valve motor based on the second error using a second PID control scheme.

In some implementations, the audible noise is caused by flow pulsations in the intake system that propagate to an ambient environment via an airbox of the intake system. In some implementations, the engine does not include a separate intake noise suppression or canceling device. In some implementations, the engine is a twin-turbocharged, six cylinder engine and the LPEGR system is a low pressure cooled EGR (LPCEGR) system associated with one turbocharger loop of the engine.

According to another example aspect of the invention, an intake noise suppression method for a forced-induction engine having an LPEGR system configured to recirculate exhaust gas produced by the engine to an intake system of the engine via an EGR port is presented. In one exemplary implementation, the method comprises: receiving, by a controller of the engine and from a MAF sensor of the engine, a MAF signal indicative of measured airflow through the intake system, detecting, by the controller and based on the MAF signal, intake system conditions that are indicative of audible noise, and in response to detecting the detected intake system conditions that are indicative of audible noise, at least partially closing, by the controller, a dP valve to mitigate or eliminate the intake system conditions and the corresponding audible noise, wherein the MAF sensor is disposed in the intake system upstream from the dP valve.

In some implementations, the method further comprises: determining, by the controller, a desired MAF signal amplitude based on a set of engine operating parameters, determining, by the controller, an average amplitude of the MAF signal over a period of time, and detecting, by the controller, the intake system conditions that are indicative of audible noise when the average MAF signal amplitude exceeds the desired MAF signal amplitude. In some implementations, the method further comprises: determining, by the controller, a first error indicative of a difference between the average and desired MAF signal amplitudes, determining, by the controller, a dP valve angle adjustment value based on the first error and using a first PID control scheme, determining, by the controller, a target dP valve angle based on a base dP valve angle, an EGR status, and a dP valve angle limit, and controlling, by the controller, an angle of the dP valve based on the target dP valve angle.

In some implementations, at least partially closing the dP valve comprises closing the dP valve up until the dP valve angle limit is reached, and the dP valve angle limit corresponds to a minimum EGR valve dP for a target engine operating efficiency. In some implementations, the dP valve comprises a dP valve motor and a dP valve angle sensor and the method further comprises: determining, by the controller, a second error indicative of a difference between an actual dP valve angle as measured by the dP valve angle sensor and the target dP valve angle, and controlling, by the controller, a duty cycle of the dP valve motor based on the second error using a second PID control scheme.

In some implementations, the audible noise is caused by flow pulsations in the intake system that propagate to an ambient environment via an airbox of the intake system. In some implementations, the engine does not include a separate intake noise suppression or canceling device. In some implementations, the engine is a twin-turbocharged, six cylinder engine and the LPEGR system is an LPCEGR system associated with one turbocharger loop of the engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, in vehicle forced-induction engines having low pressure exhaust gas recirculation (low pressure EGR, or LPEGR) systems, recirculated exhaust gas sometimes propagates back through an intake system of the engine, which could result in audible noise (e.g., a low frequency drone sound) that could be undesirable to a driver of the vehicle or other nearby persons. This issue could also potentially worsen over time as aging/wear of engine components occurs. Conventional solutions to this audible noise are limiting LPEGR operation, which could decrease engine performance/efficiency, and/or adding additional noise-canceling hardware (a muffler/resonator, an active sound canceling or noise suppression system etc.), which could increase costs. Accordingly, improved intake noise suppression systems and methods are presented herein that utilize exhausting engine components/sensors to mitigate or eliminate audible noise caused during LPEGR operation, which could improve engine performance/efficiency and/or reduce costs compared to the conventional solutions described above. These techniques utilize a mass air flow (MAF) sensor to detect intake system conditions that are indicative of audible noise (e.g., intake flow pulsations caused by LPEGR that could propagate out of the intake system via its airbox). In response to detecting these intake system conditions indicative of audible noise, the techniques at least partially close a differential pressure (dP) valve downstream of the MAF sensor and upstream of an LPEGR port to mitigate or eliminate the intake system conditions and the corresponding audible noise.

Figure 1:
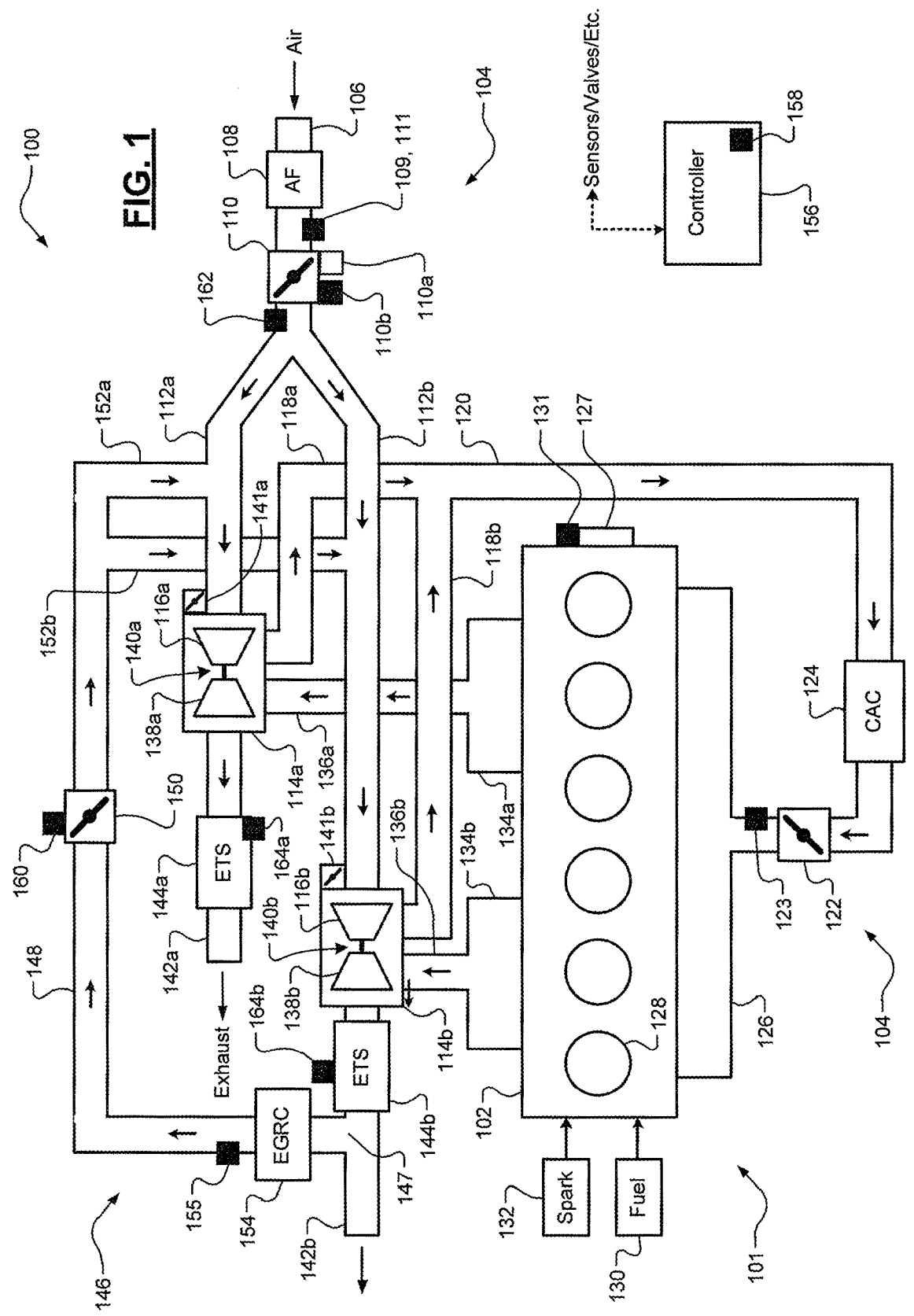
FIG. 1 is a diagram of an example forced-induction engine having a low pressure exhaust gas recirculation (LPEGR) system and an intake noise suppression system according to the principles of the present disclosure.

Referring now to FIG. 1, an example engine system 101 for a vehicle or vehicle powertrain 100 is illustrated. The engine system 101 includes a gasoline engine 102 that receives air from an intake system 104. While a gasoline engine is specifically illustrated and discussed herein, it will be appreciated that the techniques of the present disclosure could be applicable to any internal combustion engine having an LPEGR system. An intake path 106 receives fresh air that is filtered by an air filter (AF) 108 in an air box. A delta or differential pressure (dP) valve 110 (e.g., comprising a dP valve motor 110a and a dP valve angle sensor 110b) regulates the flow of air through the intake path 106 and a pressure in intake paths 112a, 112b. Turbochargers 114a, 114b comprise compressors 116a, 116b ("compressors 116") that force air/exhaust gas from the intake paths 112a, 112b through intake paths 118a, 118b that converge into a single intake path 120. While two turbochargers 114a and 114b are shown, it will be appreciated that the engine system 101 could have only one turbocharger and associated piping. It will also be appreciated that the engine 102 could have another forced-induction configuration, such as a supercharger-type boost device. A throttle valve 122 regulates the flow of air/exhaust gas through a CAC 124 and into an intake manifold 126. It will be appreciated that the throttle 122 could be implemented upstream from the CAC 124. The air/exhaust gas in the intake manifold 126 is provided to a plurality of cylinders 128, combined with gasoline from a fuel system 130 and combusted by spark from spark plugs 132 to drive pistons (not shown) that generate drive torque at a crankshaft 127. The cylinders 128 are divided into two banks 129a, 129b. While six cylinders (three cylinders per bank) are shown, it will be appreciated that the engine 102 could include any suitable number of cylinders (4, 8, etc.). An engine speed sensor 131 measures a rotational speed of the crankshaft 127, also known as a speed of the engine 102. Air flow into the cylinders 128 is controlled via an intake control system (not shown), which could comprise an intake camshaft (e.g., having different lift profiles) and intake valves for each cylinder 128.

In one exemplary implementation, the fuel system 130 comprises a fuel tank that houses fuel (e.g., gasoline), a fuel rail that houses pressurized fuel, fuel injectors that open/close to inject the pressurized fuel into the engine 102, and a fuel pump that pumps the fuel from the fuel tank to the fuel rail to generate the pressurized fuel. The fuel system 130 could also optionally include an evaporative emissions (EVAP) system that captures fuel or "purge" vapor that evaporates from the fuel in the fuel tank and stores it in a vapor canister and provides the fuel vapor to any suitable point in the intake system 104 (e.g., after the dP valve 110) via an EVAP line and a purge valve. Fuel vapor is highly combustible and therefore is able to increase engine power and/or efficiency. Exhaust gas resulting from combustion is expelled from the cylinders 128 into exhaust manifolds 134a, 134b. Each exhaust manifold 134a, 134b, for example, could be associated with cylinder banks 129a, 129b, respectively. Exhaust gas flow out of the cylinders 128 is controlled via an exhaust control system (not shown), which could include an exhaust camshaft (e.g., having different lift profiles) and exhaust valves for each cylinder 128. The exhaust gas in exhaust manifold 134a flows through exhaust path 136a and its kinetic energy drives a turbine 138a of turbocharger 114a. The turbine 138a drives compressor 116a via a shaft 140a. Similarly, the exhaust gas in exhaust manifold 134b flows through exhaust path 136b and its kinetic energy drives a turbine 138b of turbocharger 114b, which in turn drives compressor 116b via a shaft 140b. Wastegate valves 141a, 141b regulate turbocharger speed/boost pressure.

The exhaust gas flows from turbines 138a, 138b through exhaust paths 142a, 142b and is treated by exhaust treatment systems (ETS) 144a, 144b to decrease or eliminate emissions before being released into the atmosphere. Non-limiting example components include gasoline particulate filters (GPFs), there-way catalytic converters (TWCs), and mufflers. It will be appreciated that each ETS 144a, 144b could include other exhaust treatment components. A low pressure EGR (LPEGR) system 146 recirculates exhaust gas from an EGR pickup point 147 downstream of ETS 144b through an EGR path 148 that is regulated by an EGR valve 150. The EGR path 148 splits into separate EGR paths 152a, 152b which direct the exhaust gas to ports in intake paths 112a, 112b downstream of the dP valve 110 and upstream of the compressors 116a, 116b. The LPCEGR system 146 also includes an EGR cooler (EGRC) 154 that cools the exhaust gas. Because turbocharged gasoline engines operate at very high temperatures, cooling of the recirculated exhaust gas could provide for increased performance. A controller 156 controls operation of the engine system 101. It will be appreciated that the term "controller" as used herein refers to any suitable control device or set of multiple control devices that is/are configured to perform at least a portion of the techniques of the present disclosure. Non-limiting examples include an application-specific integrated circuit (ASIC) and one or more processors and a non-transitory memory having instructions stored thereon that, when executed by the one or more processors cause the controller to perform a set of operations. The one or more processors could be a single processor or two or more processors operating in a parallel or distributed architecture.

An optional inlet air temperature sensor 109 and a mass air flow (MAF) sensor 111 measure intake air temperature and intake mass air flow. It will be appreciated that the inlet air temperature sensor 109 could also be arranged in other suitable positions of the intake system 104. An optional charge air temperature sensor 123 measures ACT at an outlet of the throttle valve 122. An optional EGRC outlet temperature sensor 155 measures a temperature of EGR at an outlet of the EGRC 154. The controller 156 includes a barometric pressure sensor 158 that measures barometric pressure. It will be appreciated that the barometric sensor 158 could be external to the controller 156. An EGR valve delta pressure sensor 160 is disposed proximate to the EGR valve 150 and measures a delta pressure across the EGR valve 150. A dP valve outlet pressure sensor 162 measures a pressure at an outlet of the dP valve 110. As previously mentioned, this dP valve outlet pressure also corresponds to inlet pressures of the compressors 116a, 116b. Lastly, exhaust gas concentration sensors 164a, 164b measure exhaust gas concentration. In one exemplary implementation, the exhaust gas concentration sensors 164a, 164b are WRO2 sensors configured to measure an air/fuel ratio (FA) of the exhaust gas. All of these sensors provide their measurements to the controller 156, e.g., via a controller area network (CAN, not shown). The controller 156 is also able to control the various valves and other devices/systems described herein, e.g., via the CAN. The controller 156 is also configured to implement at least a portion of the techniques of the present disclosure, which are now described in greater detail.

Figure 2:
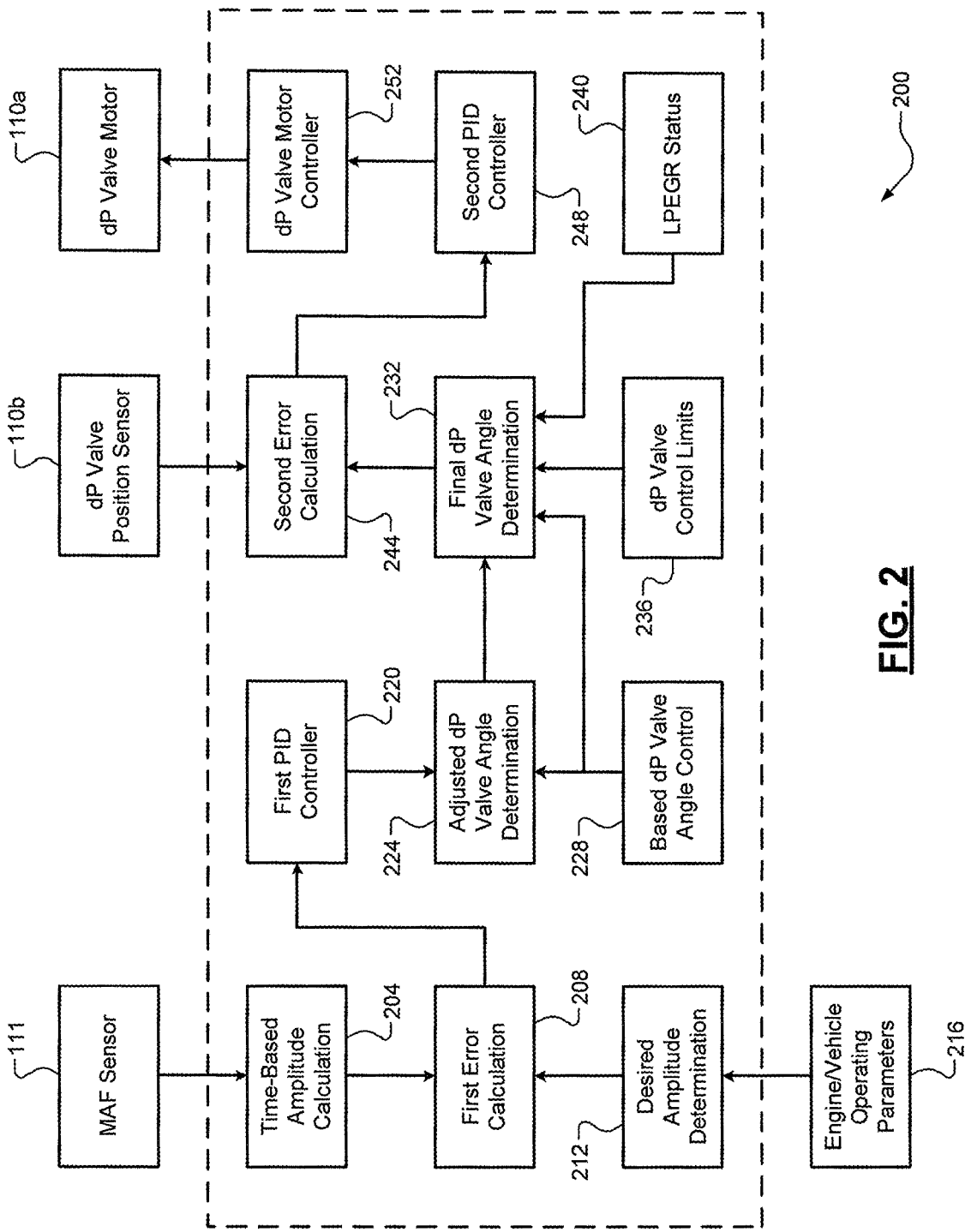
FIG. 2 is a functional block diagram of an example intake noise suppression control architecture for the intake noise suppression system according to the principles of the present disclosure.

Referring now to FIG. 2, a functional block diagram of an example intake noise suppression control architecture 200 according to the principles of the present disclosure is illustrated. In one exemplary implementation, the architecture 200 is implemented by the controller 156 of FIG. 1 (e.g., as software), but it will be appreciated that the architecture 200 could be implemented by any suitable engine control system. The MAF sensor 111 provides a MAF signal indicative of mass airflow or through the intake system 104. As previously discussed herein, EGR propagating back through the intake system 104 affects this MAF signal (e.g., causes fluctuations or oscillations to the MAF signal). A time-based amplitude calculation 204 calculates a time-based (e.g., time averaged) amplitude of the MAF signal. This value is fed to a first error calculation 208. Also fed to the first error calculation 208 is a value from a desired amplitude determination 212, which, based on other engine/vehicle operating parameters (speeds, temperatures, pressures, etc.) determines a desired amplitude or threshold for the MAF signal. This desired amplitude or threshold could be, for example, a maximum acceptable amount of MAF signal fluctuation that could cause a certain amount of audible noise. The first error calculation 208 calculates a difference or error between the time-based (average) MAF signal amplitude and the desired amplitude or threshold for the MAF signal. This difference or error is fed to a first proportional-integral-derivative (PID) controller 220, which uses a PID control scheme to generate and provide a correction or adjustment value to an adjusted dP valve angle determination 224. While a PID control scheme is described herein, it will be appreciated that a PI control scheme or any other suitable feedback-based control scheme could be utilized.

The adjusted dP valve angle determination 224 determines a dP valve angle adjustment value based on the correction or adjustment value from the first PID controller 220 and a base dP valve angle (e.g., generated based on a normal dP valve control routine). The dP valve angle adjustment value is provided to a final dP valve angle determination 232 that determines a final dP valve angle (e.g., a target value) based on the dP valve angle adjustment value, the base dP valve angle, and also taking into account dP valve control limits 236 (e.g., predetermined angle limits for the dP valve 110) and an LPEGR status 240 (EGR valve position, etc.). Using all of these inputs, the final dP valve angle determination 232 outputs a final dP valve angle (e.g., a target value) to a second error calculation 244, which calculates a difference or error between the final dP valve angle and a current or measured dP valve angle from dP valve position sensor 110b. This difference or error is provided to a second PID controller 248, which uses a PID control scheme to generate and provide a correction or adjustment value to a dP valve motor controller 252. Again, while a PID control scheme is described herein, it will be appreciated that a PI control scheme or any other suitable feedback-based control scheme could be utilized. Finally, the dP valve motor controller 252 controls the dP valve motor 110a to position the dP valve at the desired position to mitigate or eliminate the audible noise that would be caused by LPEGR operation. This could include, for example only, the dP valve motor controller 252 generating a duty cycle for the dP valve motor 110a. While a single iteration or flow through the architecture is described, it will be appreciated that the architecture 200 could continuously and repeatedly be running, thereby adjusting the dP valve position for both optimal engine performance/efficiency and mitigating or eliminating the audible noise that would be caused by LPEGR operation as much as is possible given system constraints/limits.

Figure 3:
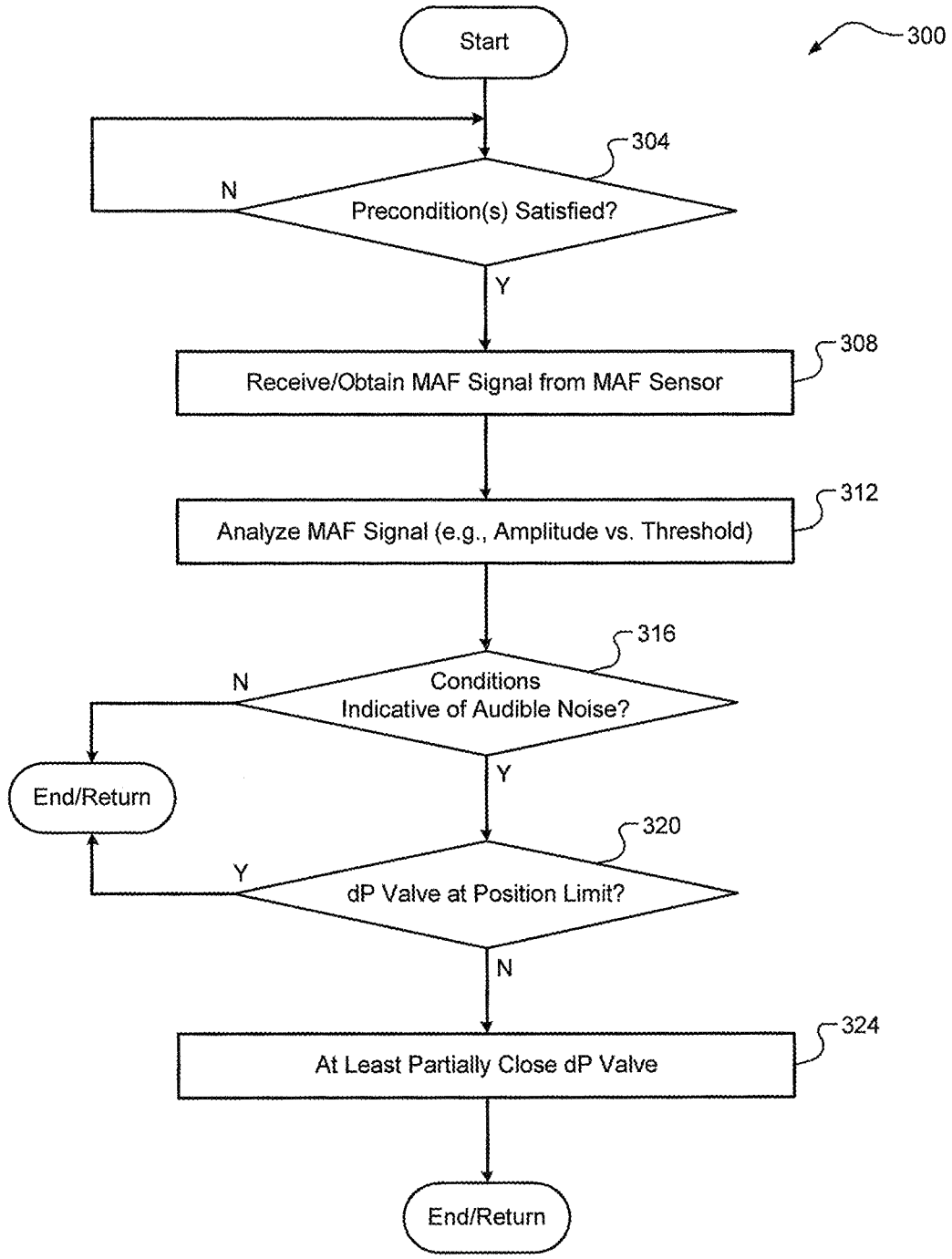
FIG. 3 is a flow diagram of an example intake noise suppression method for a forced-induction engine having an LPEGR system according to the principles of the present disclosure.

Referring now to FIG. 3, a flow diagram of an example intake noise suppression method 300 for a forced-induction engine having an LPEGR system according to the principles of the present disclosure is illustrated. While the method 300 will be described with reference to engine system 100 of FIG. 1, it will be appreciated that the method 300 could be applicable to any suitable internal combustion engine system having an LPEGR system (e.g., an LPCEGR system). At 304, the controller 156 determines whether a set of one or more preconditions are satisfied. These preconditions(s) could include, for example only, the engine 102 is running, LPEGR operation is occurring, and there are no existing component malfunctions (e.g., a malfunctioning MAF sensor 111 or dP valve 110). When the precondition(s) are satisfied, the method 300 proceeds to 308. Otherwise, the method 300 ends or returns to 304 until the precondition(s) are satisfied. At 308, the controller 156 obtains or receives the MAF signal from the MAF sensor 111. At 312, the controller 156 analyzes the MAF signal (e.g., compares MAF signal amplitude to a threshold). At 316, the controller 156 determines whether the MAF signal analysis identified intake system conditions that are indicative of audible noise. For example only, this could be the average MAF signal amplitude exceeding a dynamically determinable threshold as previously described herein. When false, the method 300 ends or returns to 304. When true, however, the method 300 proceeds to 320. At 320, the controller 156 determines whether the dP valve 110 is able to be closed (e.g., whether it has reached a position limit as previously described herein). When false, the method 300 ends or returns (e.g., to 304). When true, however, the method 300 proceeds to 324 where the controller 156 closes the dP valve (e.g., by a certain amount or to a desired position) to mitigate or eliminate the audible noise that would be caused by the detected intake system MAF fluctuation. It will be appreciated that this gradual closure of the dP valve 100 could occur as a feedback loop (e.g., at least partially close at 324 and return to 320), such as the PI or PID feedback scheme previously described herein. The method 300 then ends or returns (e.g., to 304 for one or more additional cycles).

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An intake noise suppression system for a forced-induction engine having a low pressure exhaust gas recirculation (LPEGR) system configured to recirculate exhaust gas produced by the engine to an intake system of the engine via an EGR port, the intake noise suppression system comprising: a differential pressure (dP) valve disposed in the intake system upstream from the EGR port and configured to control a dP across an EGR valve of the LPEGR system; a mass air flow (MAF) sensor disposed in the intake system upstream from the dP valve and configured to generate a MAF signal indicative of measured airflow through the intake system; and a controller configured to: based on the MAF signal, detect intake system conditions that are indicative of audible noise; and in response to the detected intake system conditions that are indicative of audible noise, at least partially close the dP valve to mitigate or eliminate the intake system conditions and the corresponding audible noise.

2. The intake noise suppression system of claim 1, wherein the controller is further configured to:
   determine a desired MAF signal amplitude based on a set of engine operating parameters;
   determine an average amplitude of the MAF signal over a period of time; and
   detect the intake system conditions that are indicative of audible noise when the average MAF signal amplitude exceeds the desired MAF signal amplitude.

3. The intake noise suppression system of claim 2, wherein the controller is further configured to:
   determine a first error indicative of a difference between the average and desired MAF signal amplitudes;
   determine a dP valve angle adjustment value based on the first error and using a first proportional-integral-derivative (PID) control scheme;
   determine a target dP valve angle based on a base dP valve angle, an EGR status, and a dP valve angle limit; and
   control an angle of the dP valve based on the target dP valve angle.

4. The intake noise suppression system of claim 3, wherein the controller is configured to close the dP valve up until the dP valve angle limit is reached, and wherein the dP valve angle limit corresponds to a minimum EGR valve dP for a target engine operating efficiency.

5. The intake noise suppression system of claim 3, wherein the dP valve comprises a dP valve motor and a dP valve angle sensor and the controller is further configured to:
   determine a second error indicative of a difference between an actual dP valve angle as measured by the dP valve angle sensor and the target dP valve angle; and
   control a duty cycle of the dP valve motor based on the second error using a second PID control scheme.

6. The intake noise suppression system of claim 1, wherein the audible noise is caused by flow pulsations in the intake system that propagate to an ambient environment via an airbox of the intake system.

7. The intake noise suppression system of claim 1, wherein the engine does not include a separate intake noise suppression or canceling device.

8. The intake noise suppression system of claim 1, wherein the engine is a twin-turbocharged, six cylinder engine and the LPEGR system is a low pressure cooled EGR (LPCEGR) system associated with one turbocharger loop of the engine.

9. An intake noise suppression method for a forced-induction engine having a low pressure exhaust gas recirculation (LPEGR) system configured to recirculate exhaust gas produced by the engine to an intake system of the engine via an EGR port, the method comprising: receiving, by a controller of the engine and from a mass air flow (MAF) sensor of the engine, a MAF signal indicative of measured airflow through the intake system; detecting, by the controller and based on the MAF signal, intake system conditions that are indicative of audible noise; and in response to the detected intake system conditions that are indicative of audible noise, at least partially closing, by the controller, a differential pressure (dP) valve to mitigate or eliminate the intake system conditions and the corresponding audible noise, wherein the MAF sensor is disposed in the intake system upstream from the dP valve.

10. The method of claim 9, further comprising:
determining, by the controller, a desired MAF signal amplitude based on a set of engine operating parameters;
determining, by the controller, an average amplitude of the MAF signal over a period of time; and
detecting, by the controller, the intake system conditions that are indicative of audible noise when the average MAF signal amplitude exceeds the desired MAF signal amplitude.

11. The method of claim 10, further comprising:
determining, by the controller, a first error indicative of a difference between the average and desired MAF signal amplitudes;
determining, by the controller, a dP valve angle adjustment value based on the first error and using a first proportional-integral-derivative (PID) control scheme;
determining, by the controller, a target dP valve angle based on a base dP valve angle, an EGR status, and a dP valve angle limit; and
controlling, by the controller, an angle of the dP valve based on the target dP valve angle.

12. The method of claim 11, wherein at least partially closing the dP valve comprises closing the dP valve up until the dP valve angle limit is reached, and wherein the dP valve angle limit corresponds to a minimum EGR valve dP for a target engine operating efficiency.

13. The method of claim 11, wherein the dP valve comprises a dP valve motor and a dP valve angle sensor and the method further comprises:
determining, by the controller, a second error indicative of a difference between an actual dP valve angle as measured by the dP valve angle sensor and the target dP valve angle; and
controlling, by the controller, a duty cycle of the dP valve motor based on the second error using a second PID control scheme.

14. The method of claim 9, wherein the audible noise is caused by flow pulsations in the intake system that propagate to an ambient environment via an airbox of the intake system.

15. The method of claim 9, wherein the engine does not include a separate intake noise suppression or canceling device.

16. The method of claim 9, wherein the engine is a twin-turbocharged, six cylinder engine and the LPEGR system is a low pressure cooled EGR (LPCEGR) system associated with one turbocharger loop of the engine.

* * * * *